United States Patent [19]

Kashio

[11] 4,127,879
[45] Nov. 28, 1978

[54] DATA READ-WRITE APPARATUS FOR A MAGNETIC RECORDING MEDIUM

[75] Inventor: Toshio Kashio, Tokyo, Japan

[73] Assignee: Casio Computer Co., Ltd., Tokyo, Japan

[21] Appl. No.: 702,899

[22] Filed: Jul. 6, 1976

[30] Foreign Application Priority Data

Jul. 4, 1975 [JP] Japan .................................. 50-82579
Oct. 21, 1975 [JP] Japan .................................. 50-125869

[51] Int. Cl.² ............................................. G11B 5/09
[52] U.S. Cl. ...................................................... 360/51
[58] Field of Search .................................... 360/48, 51

[56] References Cited

U.S. PATENT DOCUMENTS

| | | | |
|---|---|---|---|
| 3,423,744 | 1/1969 | Gerlach et al. ........................ | 360/39 |
| 3,500,362 | 3/1970 | Schmitz et al. ....................... | 360/51 |
| 3,764,989 | 10/1973 | McClellan ........................ | 340/172.5 |
| 3,778,793 | 12/1973 | Hayashi et al. ....................... | 360/51 |
| 3,805,167 | 4/1974 | Nash et al. ........................... | 328/61 |
| 3,865,981 | 2/1975 | Welch et al. .......................... | 360/51 |
| 3,947,878 | 3/1976 | McGrath et al. ...................... | 360/51 |
| 4,053,944 | 10/1977 | Dixon ................................... | 360/51 |

FOREIGN PATENT DOCUMENTS

2,169,086 1/1973 France .................................... 360/39

OTHER PUBLICATIONS

IBM TDB, vol. 2 #4, Dec. 1959, pp. 64–65 – "Self-syncing Clock for Binary Data" by Morphert, Jr.

*Primary Examiner*—Vincent P. Canney
*Attorney, Agent, or Firm*—Flynn & Frishauf

[57] ABSTRACT

A data read-write apparatus for a magnetic recording medium, wherein, when data represented by coded signals are written in a magnetic recording medium, a binary "1" signal of at least one bit is written in the magnetic recording medium ahead of data being written upon receipt of a clock pulse from a clock pulse oscillator; thereafter a series of binary coded signals denoting the content of the data are written in the magnetic recording medium; when the data are read out from the magnetic recording medium, the binary code "1" signal is first detected; upon said detection, the phase of clock pulses issued from the clock pulse oscillator are synchronized with the timing in which the binary coded "1" signal is read out; upon receipt of a phase-synchronized clock pulse, other binary coded signals stored in the magnetic recording medium in succession to the binary coded "1" signal are read out in synchronization with clock pulses sent forth from the clock pulse oscillator; and the clock pulse oscillator successively produces clock pulses for defining the intervals at which bits constituting data stored in the magnetic recording medium are read out or the intervals at which bits representing fresh data are written in the magnetic recording medium, thereby controlling the phases of the generated clock pulses.

4 Claims, 4 Drawing Figures

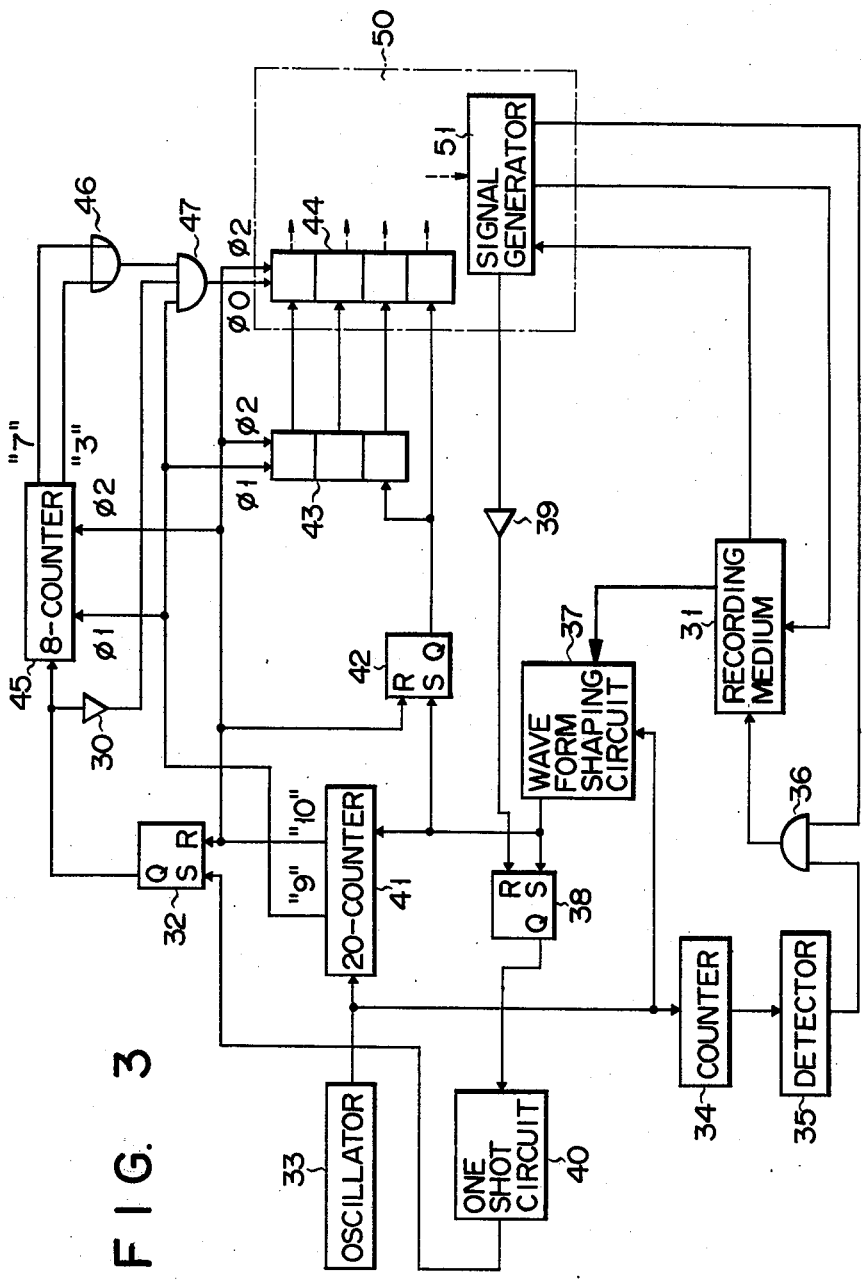
F I G. 3

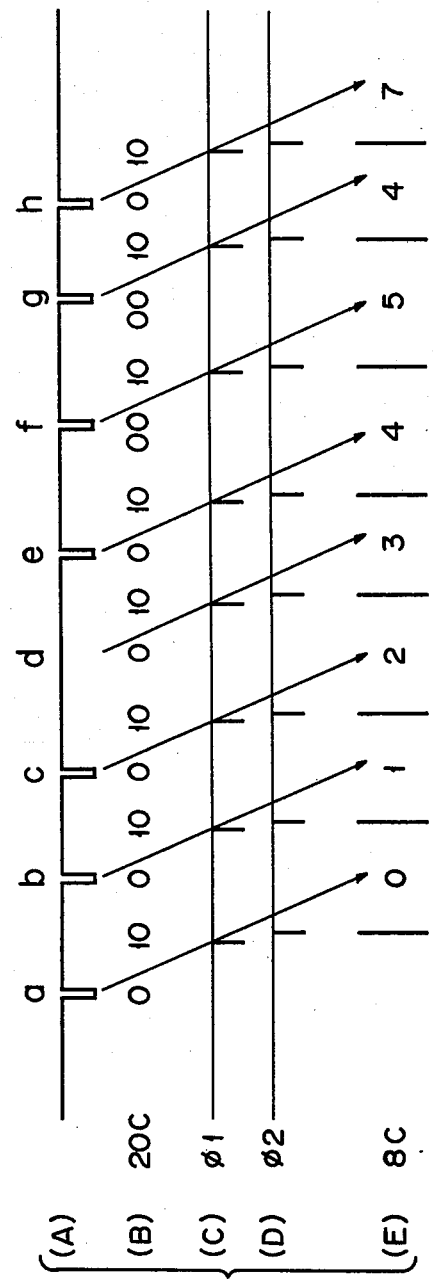

DATA READ-WRITE APPARATUS FOR A MAGNETIC RECORDING MEDIUM

This invention relates to a data read-write apparatus improved in the process of writing coded bit data in a magnetic recording medium or reading out the data therefrom.

Various forms of data processed by a data-processing device such as an electronic computer are stored in the form of coded bits in a magnetic recording medium, for example, a tape, drum or disk. Data is written in or read out from such recording medium by mechanically moving the recording medium through a stationary magnetic head disposed to face the recorded surface of the recording medium.

Under an ideal condition in which the magnetic recording medium is stably driven at a specified speed, then the intervals at which data-constituting bits are written or read out are fixed, attaining the easy control of synchronization with which bits are particularly read out and in consequence a correct readout of data. Since, however, the magnetic recording medium is mechanically driven (probably with mechanical fluctuations) are and data is stored with a high density, it is difficult to attain synchronization for bits being read out by means of an output from, for example, a specified clock pulse oscillator. Therefore, it is necessary to control synchronization for the readout of data bits from a magnetic recording medium according to the manner in which the data bits are arranged. To this end, the magnetic recording medium is further stored, in addition to data, with a synchronizing signal to control readout synchronization.

Namely, two parallel tracks of data are written in a magnetic recording medium by supplying data signals to one magnetic head and synchronizing signals for said data to another magnetic head. Thus control of readout synchronization is effected by reading out data signals and synchronizing signals in parallel from the two magnetic heads respectively. However, the above-mentioned prior art read-write apparatus has the drawbacks that a magnetic recording medium provided with two tracks for data signals and synchronizing signals respectively must have a large storing capacity; parallel operation of the two magnetic heads for read and write complicates the mechanical arrangement of a data read-write apparatus; provision of the two magnetic heads occupy a large space in the apparatus; and the precision with which data is written in a magnetic recording medium directly effects the synchronization with which data bits are read out, demanding a high precision for mechanical arrangement.

With another type of data read-write apparatus, synchronizing signals and coded data bit signals are linearly stored in turn in a magnetic recording medium. This process is intended readout synchronizing signals at a substantially specified interval, activate, for example, a monostable multivibrator circuit by a synchronizing signal read out, and detect the synchronization of data bit signals read out within a range specified by the monostable multivibrator circuit. The above-mentioned prior art apparatus has the disadvantages that one synchronizing signal has to be provided for each of data bits, namely, requiring substantially the same number of synchronizing signals as data bits; it is impossible to store data in a magnetic recording medium with a sufficiently high density; and the synchronizing signals have to be stored in the magnetic recording medium in an amount corresponding to that of data, thus limiting the effective use of the storing capacity of the magnetic recording medium for data.

SUMMARY OF THE INVENTION

It is accordingly the object of this invention to provide a data read-write apparatus which is improved in the aforesaid drawbacks accompanying the prior art apparatus, easily decreases a number of synchronizing signals required for data bits and also the intervals at which data bits are arranged in a magnetic recording medium, thereby effectively increasing the density with which data is stored therein.

To this end, this invention provides a data read-write apparatus for a magnetic recording medium which comprises means for continuously issuing clock signals defining the interval at which data bits are written in or read out of a magnetic recording medium and properly controlling the phase of clock pulses; a magnetic recording medium for storing data formed of coded signals; means for writing a binary coded "1" signal having at least one bit ahead of data bits in the magnetic recording medium in synchronization with a clock pulse sent forth from the clock signal-oscillator means and also a series of binary coded signals representing data in succession to the binary coded "1" signal; means for detecting the readout of the binary coded "1" signal written ahead of the data when the data is read out of the magnetic recording medium and synchronizing the phase of clock pulses produced by the clock pulse-oscillator means with the timing in which the binary coded "1" signal is read out; and means for reading out other binary coded signals following the binary coded "1" signal upon receipt of phase-synchronized clock pulses.

Therefore, this invention enables data to be stored in a magnetic recording medium such as a tape, drum or disk with a higher density than in the prior art apparatus and, at the time of reading, can detect data bits in reliably correct synchronization, though a readout speed may vary. Particularly, the timing in which data bits are detected is defined by a counter for counting clock pulses issued, making it possible definitely to preset a data bit detection timing line. As the result, synchronized reading can be unfailingly effected, even when data is stored in a magnetic recording medium with a high density by narrowing the intervals at which data bits are arranged in the recording medium.

With the prior art data read-write apparatus, the magnetic recording medium is driven with a speed error of ±2% at maximum. Where, therefore, a clock pulse oscillator consists of a type having a high stability of frequency such as a quartz oscillator, then data can be read out with fully precise synchronization.

BRIEF DESCRIPTION OF THE DRAWINGS

This invention can be more fully understood from the following detailed description when taken in conjunction with the accompanying drawings, in which:

FIG. 3 is a block circuit diagram of a data read-write apparatus according to another embodiment of the invention; and FIGS. 4A to 4E present the timing in which the circuit of FIG. 3 is operated.

DETAILED DESCRIPTION

There will now be described by reference to the appended drawings a data read-write apparatus according to an embodiment of this invention.

Figure 1:
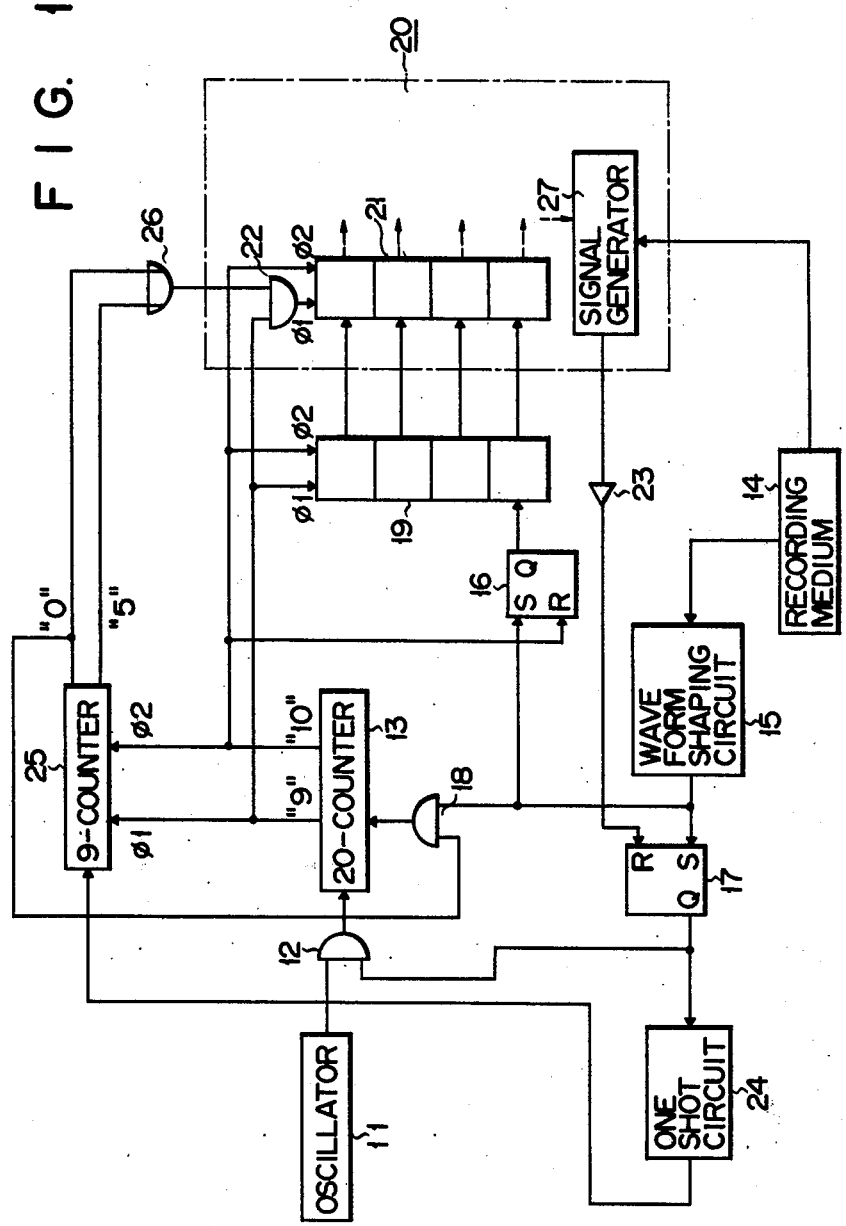
FIG. 1 is a block circuit diagram of a data read-write apparatus according to an embodiment of this invention.

FIG. 1 indicates the arrangement of the data read-write apparatus. The apparatus is operated with a clock pulse oscillator 11 whose frequency is set at a prescribed level. The frequency of the oscillator 11 is chosen to issue an $n$ number of pulses determined by the interval at which bit signals are read out of a magnetic recording medium under normal condition. $n$ is chosen to be 20 in this first embodiment. Namely, one bit signal is read out of the magnetic recording medium, each time 20 pulses are issued from the clock pulse oscillator 11.

Clock pulses from the clock pulse oscillator 11 are supplied as a count-advancing signal to a 20-scale counter 13 through an AND circuit 12. The counter 13 produces a signal when the count made indicates "9" and "10". Output signals from the counter 13 which correspond to the count "9" and "10" are used as clock pulses $\phi_1$, $\phi_2$ to control the later described readout of data.

Figure 2:
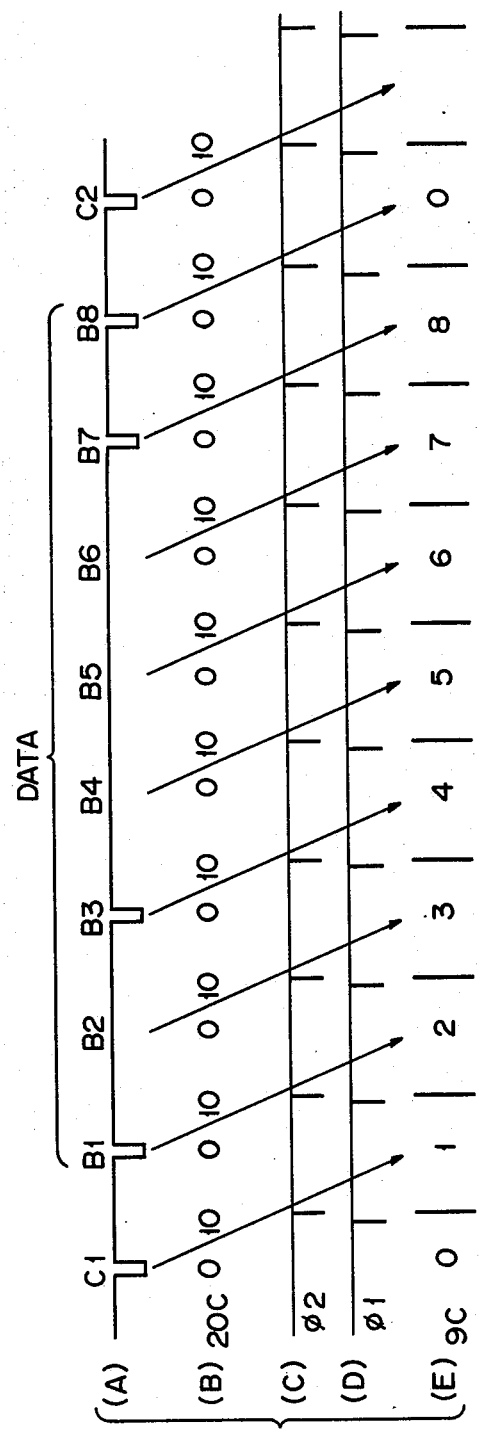
FIGS. 2A to 2E show the timing in which the circuit of FIG. 1 is operated.

Data is read out of a magnetic recording medium such as a disk, drum, or tape in the form of pulses shaped by a wave form shaping circuit 15. The pulses are issued at a specified interval as shown in FIG. 2A. According to this embodiment, one synchronizing signal $C_1$, $C_2$ ... is provided for every eight data bits. Namely, a magnetic recording medium 14 is stored with one synchronizing signal for every eight data bits. The clock pulse oscillator 11 is chosen to send forth 20 clock pulses between data bits. Where it is assumed that a count "0" (FIG. 2B) issued from the counter 13 has the same timing as bits (FIG. 2A) read out of the magnetic recording medium 14, then clock pulses $\phi_1$, $\phi_2$ are produced at the intervals shown in FIG. 2C, 2D, respectively.

Output signals read out of the magnetic recording medium 14 and thereafter shaped by the shaping circuit 15 are delivered as a set instruction to flip-flop circuits 16, 17 and as a reset instruction to the counter 13 through an AND circuit 18. The flip-flop circuit 16 is reset upon receipt of a clock pulse wherein the counter 13 counts "10". A set output signal from the flip-flop circuit 16 is supplied to a first stage 1 bit-memory element of a buffer memory circuit 19 consisting of four 1 bit-memory element arranged in series. The 1-bit memory elements of the buffer memory circuit 19 are designed to admit of writing upon receipt of the clock pulse $\phi_1$, and readout upon receipt of the clock pulse $\phi_2$. Thus the buffer memory circuit 19 can be stored with data consisting of four series-arranged bits. 4-bit data stored in the buffer memory circuit 19 is read out in parallel with similar 4-bit data stored in another buffer memory circuit 21 of a data-processing device 20. This buffer memory circuit 21 is designed to admit of writing of data in the magnetic recording medium 14 upon receipt of a clock pulse $\phi_1$ and readout of data from said recording medium 14 upon receipt of a clock pulse $\phi_2$. An operation signal generator 27 of the data processing device 20 is supplied with an index signal designating the starting point of the readout of data from the magnetic recording medium 14. During the readout of data, an inverter 23 is supplied with a readout signal. When readout does not take place, the inverter 23 sends forth a reset instruction to the flip-flop circuit. When set, the flip-flop circuit 17 issues a gate signal to the AND circuit 12. When set, a one shot pulse circuit 24 generates a one shot pulse, which in turn is delivered as a reset signal to a control counter 25, which is used to detect synchronizing signals included in coded signals read out of the magnetic recording medium 14. The counter 25 is set at a 9-scale to match the frequency of synchronizing signals produced and advances counting upon receipt of clock pulses $\phi_1$, $\phi_2$ from the counter 13. The counter 25 makes counts as shown in FIG. 2E. When counting "0" and "5", the counter 25 supplies a signal to an OR circuit, an output from which opens the gate of an AND circuit 22. An output signal from the counter 25 when it counts "0" is transmitted as a gate signal to the circuit 18.

While, with the data read-write device of the above-mentioned arrangement, data is not read out of the magnetic recording medum 14, the flip-flop circuit 16 is reset at the original condition. The flip-flop circuit 17 is also reset by the inverter 23. Since, at this time, the gate of the AND circuit 12 is not opened, an output signal from the clock pulse oscillator 11 is not carried to the counter 13.

When, under the above-mentioned condition, the magnetic recording medium 14 is driven to read out data, then the data-processing device 20 is operated by an index signal to generate a readout signal. When data signals are read out of the magnetic recording medium 14 upon receipt of an index signal, said data signals are drawn out in the form of pulse signals through the shaping circuit 15.

Namely, the shaping circuit 15 sends forth a synchronizing signal (FIG. 2A) in response to the readout of data from the magnetic recording medium 14. This synchronizing signal sets both flip-flop circuits 16, 17. An output pulse from the one shot pulse circuit 24 resets the control counter 25 at a "0" count. This control circuit consists of, for example, a binary counter which is reset immediately upon receipt of a reset instruction. The AND circuit 18 also generates an output when the control counter 25 produces an output denoting a count of "0", thereby resetting the counter 13. When supplied with an output signal from the clock pulse oscillator 11 through the AND gate 12 whose gate is opened when the flip-flop circuit 17 is set, the counter 13 commences counting from "0". The condition of the flip-flop circuit 16 is stored in the buffer memory circuit 19 upon receipt of a clock pulse $\phi_1$ which is delivered when the counter 13 counts "9". The flip-flop circuit 16 is reset by a clock pulse $\phi_2$ which is generated when the counter 13 counts "10".

When a data bit following the synchronizing signal $C_1$ (bit $B_1$ of FIG. 2A) is read out of the magnetic recording medium 14, then the flip-flop circuit 16 is set in response to said readout. Upon receipt of clock pulses $\phi_1$, $\phi_2$ from the counter 13, data is written in the buffer memory circuit 19. During this time, the control counter 25 counts a number of bits upon receipt of clock pulses $\phi_1$, $\phi_2$ from the counter 13. The buffer memory circuit 19 is stored with data supplied as a set output from the flip-flop circuit 16 and read out from the magnetic recording medium 14. The data stored in the buffer memory circuit 16 is shifted, thereby causing data bits (FIG. 2A) to be successively written in the buffer memory circuit 19. The manner in which data bits are stored in the flip-flop circuit 16 is determined according to the binary code "1" or "0" representing data bits. If all the data bits are denoted by the binary code "1", then the flip-flop circuit is set upon receipt of a clock pulse $\phi_1$. Referring to FIG. 2E shown in connection with FIG. 2A, data bits read out from the flip-flop circuit 16 in response to counts made by the control counter 25 are successively written in the buffer memory circuit 19 while being shifted. When the control counter 25 counts "5" and "0", then a "write" instruction is supplied to another buffer memory circuit 21 through the OR circuit 26 and AND circuit 22. Data stored in the buffer memory circuit 19 is read out in parallel with said another buffer memory circuit 21 to be stored in the latter buffer memory circuit 21 while being shifted. The timing in which the control counter 25 counts "5" and "0" corresponds to the timing in which four bits constituting the former half of the eight data bits laying between the synchronizing signals $C_1$ and $C_2$ and the other four bits forming the latter half of said eight data bits are written in the buffer memory circuit 19. Data is supplied to the data-processing device 20 in the form of two groups of four bits arranged in parallel. Finally, only the data stored in the magnetic recording medium 14, with synchronizing signals excluded, are delivered to the data-processing device 20.

According to the first embodiment, data of eight bits is read out to the data-processing device 20 at the rate of four bits each time. Where eight bits of data are read out at once, then it is advised to cause both buffer memory circuits 19, 21 respectively to be formed of eight bit memory elements. With the first embodiment, data was read out in the form of two groups of four bits arranged in parallel. Obviously, data may be read out in the form of two groups of four bits arranged in series.

Each time the control counter 25 counts "0", the gate of the AND circuit 18 is opened to detect a synchronizing signal read out of the magnetic recording medium 14. At this time, the counter 13 is reset to regain the original condition upon receipt of a synchronizing signal. When the counter 13 counts a prescribed number, clock pulses $\phi_1$, $\phi_2$ are issued to read out data bits in a timing corresponding to that, in which data bits read out from the magnetic recording medium 14 are transferred to the data-processing device 20.

With the above-mentioned first embodiment, a binary code "1" signal having at least one bit is stored as a synchronizing coded signal in the magnetic recording medium 14 ahead of a group of a plurality of data bits to attain the synchronization of data reading. The data read-write device according to said embodiment is provided with an n scale counter for counting clock pulses sent forth from the clock pulse oscillator which is reset upon receipt of a synchronizing coded signal from the magnetic recording medium 14. Data bits following the synchronizing coded "1" signal are delivered to the data-processing device 20, each time the n-scale counter completes one cycle of n-scale counting. The plural data bits are read out in synchronization by the corresponding synchronizing coded "1" signals.

There will now be described a data read-write apparatus according to a second embodiment of this invention in which the above-mentioned synchronizing coded "1" signals are omitted; and data is read out in synchronization, each time detection is made of a coded "1" signal included in binary coded data stored in the magnetic recording medium 14.

Referring to FIG. 3, referential numeral 31 denotes a magnetic recording device which is designed to admit of writing and reading of data when a main control device 50 consisting of, for example, CPU sends forth a "write" instruction W and a "read" instruction R to a magnetic recording medium such as a disk, drum or tape. Referential numeral 33 is a clock pulse oscillator for which a basic frequency is chosen (more preferred to be of the type providing a stable oscillation frequency, such as quartz). The basic pulse frequency is so chosen as to cause one data bit read out from the magnetic recording device 31 to be transferred to a data processing device on the basis of an n number of clock pulses. Clock pulses generated by the clock pulse oscillator 33 are supplied to a first counter 34 to be counted. Assuming n to be 20, the first counter 34 is chosen to be of the 20-scale type. Counts made by the first counter 34 are detected by a specified-count detector 35. Where a specified count is chosen to be "0", said specified count detector 35 produces a detection output, each time the first counter 34 counts "0". This detection output is delivered as a gate signal to an AND circuit 36. This AND circuit 36 is already supplied with a coded data signal issued from a signal generator 51 included in the main control device 50. The AND circuit 36 sends forth one data bit, each time the specified-count detector 35 produces a detection signal, namely, the first counter 34 counts 20 clock pulses generated by the clock pulse oscillator 33. Said data bit is conducted to the magnetic recording device 31 and written in a magnetic recording medium upon receipt of a "write" instruction W. When the signal generator 51 of the main control device 50 sends forth a "write" instruction W, and the main control device 50 issues a data signal to the AND circuit 16, then said data signal is written in the magnetic recording medium, each time the first counter counts 20 clock pulses delivered from the clock pulse oscillator 13.

The magnetic recording device 31 allows stored data to be read out upon receipt of a "read" instruction R from the main control device 50. Only those of the data bits thus read out which are represented by a binary code "1" are detected by a wave form shaping circuit 37 which in turn generates an output in synchronization with the frequency of the clock pulse oscillator 33.

The detected data bit represented by the binary code "1" sets a flip-flop circuit 38. While the signal generator 51 of the main control circuit 50 ceases to produce a "read" instruction R, the flip-flop circuit 38 is reset by an output from an inverter 39. When the magnetic recording device 31 receives a "read" instruction R and the data bit represented by the binary code "1" is read out, then the flip-flop circuit 38 is set.

A set output from the flip-flop circuit 38 is conducted to a one-shot pulse generator 40, which in turn produces a one-shot pulse to set the flip-flop circuit 32. A second counter 41 is operated by a clock pulse sent forth from the clock pulse oscillator 33. Like the first counter 34, the second counter 41 is of the 20-scale type, and is reset when the shaping circuit 37 detects the readout of a data bit represented by a binary code "1". The second counter 41 generates outputs when making two specified counts, for example, "9" and "10". Said count outputs are used as clock pulses $\phi_1$, $\phi_2$.

A detection signal delivered from the shaping circuit 37 which denotes the readout of a data bit represented by the binary code "1" is supplied as a set instruction to a flip-flop circuit 42, a set output from which is conducted to the input terminal of a memory device 43 consisting of three bit memory elements arranged in series. The memory device 43 is formed of, for example, a 2-phase type flip-flop circuit, and is supplied with a signal upon receipt of a clock pulse $\phi_1$ and generates an output upon receipt of a clock pulse $\phi_2$. The flip-flop circuit 42 is reset by a clock pulse $\phi_2$ issued from the second counter 41. When clock pulses $\phi_1$, $\phi_2$ are supplied to the memory device 43, data bits delivered from the shaping circuit 37 through the flip-flop circuit 42 are conducted to the memory device 43 to be shifted therein. Accordingly, data of, for example 4-bit character is stored by means of the flip-flop circuit 42 and the memory device 43 consisting of three bit memory elements. Four bit signals obtained when the memory device 43 and flip-flop circuit 42 are set are supplied to a buffer memory circuit 44 formed of four bit memory elements and included in the main control device 32.

Clock pulses $\phi_1$, $\phi_2$ sent forth from the second counter 41 are supplied as a count-instructing signal to a character counter 45, which makes one count, each time the clock pulses $\phi_1$, $\phi_2$ are received. When one character consists of four bits, the character counter 45 is chosen to have an 8-scale, and produce an output when making four counts such as 0 to 3 and 4 to 7. When the flip-flop circuit 32 is set, the character counter 45 is reset. Further when the flip-flop circuit 32 issues a reset instruction while the clock pulses $\phi_1$, $\phi_2$ are received, the character counter 45 is also reset. "3" and "7" count outputs from the character counter 45 are transmitted to an AND circuit 47 through an OR circuit 46. The AND circuit 47 is supplied with an output from the inverter 30 connected to the set terminal of the flip-flop circuit 32 and also with a clock pulse $\phi_1$ issued by the second counter 41. When the AND circuit 47 sends forth a clock pulse $\phi_0$, then said clock pulse $\phi_0$ and clock pulse $\phi_2$ cooperate to shift an output from the flip-flop circuit 42 and data stored in the memory device 43 to the buffer memory circuit 44.

With a data read-write apparatus according to the second embodiment of FIG. 3, the magnetic recording medium of the magnetic recording device 31 is impressed with equidistantly spaced data bits in response to an output issued from the specified-count detector 15, each time the first counter 34 counts 20 clock pulses. Where data bits are read out of the magnetic recording medium, the main control device 32 supplies a "read" instruction R to the magnetic recording device 31, and further issues a "read" instruction R to prevent a reset instruction produced by the inverter 39 from being delivered to the flip-flop circuit 18. The "read" instruction R causes data bits represented by $a$ to $h$ (FIG. 4) to be read out. Among these bits, the bits $a$, $b$, $c$, $e$, $f$, $g$, $h$ are denoted by a binary code "1" and the bit $d$ by a binary code "0".

When the shaping circuit 37 sends forth a clock pulse in response to the foremost "1" bit a read out, then the flip-flop circuits 38, 42 are set and the second counter 41 is reset. When the flip-flop circuit 38 is set, the one shot pulse generator 40 issues an output, which sets the flip-flop circuit 32. At this time, the character counter 45 is reset to regain the original condition in which said character counter 45 makes a "0" count. When counting by the counter 41 advances to "9" and "10", then clock pulses $\phi_1$, $\phi_2$ are issued. Thus data bits delivered from the flip-flop circuit 42 are written in the first stage bit memory upon receipt of the clock pulse $\phi_1$, and the flip-flop circuit 42 is reset upon receipt of the clock pulse $\phi_2$, thereby rendering the data read-write apparatus of FIG. 3 ready for the supply of fresh input. When the clock pulse oscillator 33 and the magnetic recording medium are operated at the same speed, then a "1" code signal denoting the succeeding data bit $b$ (FIG. 4A) is read out of the magnetic recording medium. An output produced by the shaping circuit 37 in response to the readout of said "1" code signal resets the second counter 41, and sets the flip-flop circuit 38. At this time, the flip-flop circuit 38 which was previously set at the readout of the "1" binary code of the foremost data bit a still remains set. Upon receipt of clock pulses $\phi_1$, $\phi_2$ issued as the result of the advanced counting of the second counter 41, data bits drawn out of the magnetic recording medium and carried through the shaping circuit 37 are written in the memory device 45 in the form of set outputs from the flip-flop circuits 42.

Where the clock pulse oscillator 33 and the magnetic, recording device 31 fail to be operated at the same speed by same cause and are operated at a higher speed, then the second counter 44 produces an output denoting a "1" data bit before making a maximum count of 20, as indicated by a data bit $c$ (FIG. 4A). This signal denoting the "1" data bit resets the second counter 44. As the result, the timing in which the second counter 41 again commences counting coincides with the timing in which the data bit $c$ is read out. When data bit $d$ represented by a binary code "0" (FIG. 4A) is read out, the second counter 41 is not reset. However, when the second counter 41 makes prescribed counts by repeated 20-scale counting cycles, then clock pulses $\phi_1$, $\phi_2$ are produced. The flip-flop circuit 42 is not set by the data bit $d$ but generates a "0" output. As the result, data bit indicated by a binary code "0" is supplied to the memory device 43.

When the data bits of $a$, $b$, $c$, and $d$ (FIG. 4A) are read out of the magnetic recording medium, then the memory device 43 is stored with data bits represented by the binary codes of "1" and "0". At this time, the character counter 45 which was initially reset through the flip-flop circuit 32 in response to an output from the one shot pulse generator 40 makes a progressive counting as "0", "1", "2", "3" .... Thus an output count signal of "3" from the character counter 45 is supplied as a gate signal to the AND circuit 47. Where, under this condition, the second counter 41 sends forth clock pulses $\phi_1$, $\phi_2$, then 4-bit data stored in the flip-flop circuit 42 and the memory device 43 is shifted to the buffer memory circuit 44 in parallel, and then read out to the main control device 50 for treatment.

Later, data bits of $e$, $f$, $g$, $h$ are read out of the magnetic recording medium. Even when the magnetic recording medium is operated at a slower speed as indicated by the data bits of $f$ and $g$, the timing in which a signal denoting a binary code "1" is issued and the timing in which said data bits of $g$ and $h$ are read out coincide with each other, thereby preventing erroneous readout of data bits. When the character counter 45 makes a count of "7", the stored 4-bit data is shifted to the buffer memory circuit. FIGS. 4A to 4E show the relationship between data bits of $a$ to $h$, clock pulses $\phi_1$, $\phi_2$, counts made by the 20-scale counter 41 and counts made by the 8-scale character counter 45. Data bits are read out in accordance with the counts made by the character counter 45. When the character counter 45 makes counts of "3" and "7", then data bits readout are shifted to the buffer memory circuit 44 in 4-bit character units. As seen from the description of data writing, the interval at which data bits are read out of the magnetic recording medium is fundamentally so chosen as to correspond to the interval at which the clock pulse oscillator 33 issues 20 clock pulses. Since, however, the magnetic recording medium is mechanically driven, some errors actually arise in the intervals at which the data bits $a$ to $h$ are read out. With a data read-write apparatus according to the second embodiment of FIG. 3, however, control clock pulses $\phi_1$, $\phi_2$ are generated according to counts made by the 20-scale counter 41 designed to define the basic interval of data bits. The 20-scale counter 41 is reset to the original counting condition of "0", each time a signal denoting the binary code "1" representing data bits is read out. Where, therefore, the wave form of bit signals is so defined as to prevent the continuous readout of "0" data bits according to the degree of reliability with which the clock pulse oscillator 33 and magnetic recording medium are operated, then clock pulses $\phi_1$, $\phi_2$ generated in response to counts made by the 20-scale counter 41 enable the synchronization with which data bits are read out to be unfailingly detected.

With the above-mentioned data read-write apparatus according to the second embodiment of FIG. 3, coded data bits are stored in a magnetic recording medium such as a drum, tape or disk without storing synchronizing signals therein. The synchronous readout of said data bits is attained with a binary coded "1" signal representing data bits used as a guide. Therefore, the second embodiment of FIG. 3 has the advantages that it is very effective for full utilization of the storing capacity of the magnetic recording medium, and the correct writing of data; it is necessary to provide the magnetic recording device with unseparate means for writing synchronizing signals in the magnetic recording medium and reading said signals therefrom; writing and reading of data is easily carried out; operation of the counter is controlled by the readout of data bits represented by a binary code "1" and a readout-synchronizing signal is formed of counts made by the counter; and the subject data read-write apparatus has a simple arrangement and is easily controlled.

With the foregoing first and second embodiments, a number of clock pulses issued by the clock pulse oscillator is chosen to be 20 to define the interval at which data bits are read out. However, it is possible to use any other number of clock pulses. Further, the relationship between counts made by the counter and the issue of clock pulses $\phi_1$, $\phi_2$ may be varied as desired. Further, the data read-write apparatus of this invention is provide with an 8-scale character counter to read data in the form of parallel arranged 4-bit character units. Where, however, series-arranged data bits are read out, the character counter is unnecessary. The capacity of the character counter may be freely chosen according to a number of bits constituting one character unit. This invention is not limited to that described above, but may be applicable in various modifications without changing the object and scope of the invention.

The buffer memory circuit 19 of FIG. 1 is formed of four bit memory elements and the buffer memory circuit 43 of FIG. 3 consists of three bit memory elements. Depending on design convenience, these buffer memory circuits 19, 43 may be replayed by each other. In this case, it is advised to control a readout instruction R supplied from the control counters 25, 45 to said buffer memory circuits 19, 43. Obviously, either of the resetting processes of FIGS. 1 and 3 may be adopted.

What is claimed is:

1. A data read-write apparatus for reading binary coded data from and writing binary coded data into a magnetic recording medium in synchronization with clock pulses from a clock pulse generating means, the apparatus comprising:

a clock pulse generating means including a reference clock pulse generator for generating $n$ clock pulses during a one-bit reading or writing period, and an $n$-scale counter driven by the clock pulses from the reference clock pulse generator;

synchronization pulse generator means coupled to said $n$-scale counter for generating a bit synchronization clock pulse every time said $n$-scale counter reaches a predetermined count;

means for writing into the magnetic recording medium a binary coded signal "1" having at least one bit ahead of said binary coded data in synchronization with a bit synchronization pulse from said synchronization pulse generator means, and then a series of binary coded signals forming said binary coded data in succession of the binary coded signal "1";

means coupled to said magnetic recording medium and to said $n$-scale counter for detecting the binary coded signal "1" being read out ahead of the binary coded data from the magnetic recording medium, to thereby produce a detection signal which sets the $n$-scale counter at the reference count so as to adjust the phase of the bit synchronization clock pulse; and means for reading out a series of binary coded signals by bit synchronizing clock pulses generated for each predetermined numerical value of the $n$-scale count which is set by the detection signal to a reference count value, said series of binary coded signals constituting subsequent binary coded data.

2. A data read-write apparatus according to claim 1 further comprising means for writing a synchronization bit represented by a binary coded signal "1" into each binary coded data item formed of a plurality of binary coded signals; and said detecting means detects a synchronization bit read out before each binary coded data from said magnetic recording medium to produce a detection signal which sets the $n$-scale counter at the reference count so as to adjust the phase of the bit synchronization clock pulse.

3. A data read-write apparatus for reading binary coded data from said writing binary coded data into a magnetic recording medium in synchronization with clock pulses from a clock pulse generating means, the apparatus comprising:

a clock pulse generating means including a reference clock pulse generator for generating $n$ clock pulses during a one-bit reading or writing period, and an $n$-scale counter driven by the clock pulses from the reference clock pulse generator;

synchronization pulse generator means coupled to said $n$-scale counter for generating a bit synchronization clock pulse every time the $n$-scale counter reaches a predetermined count;

means for writing into the magnetic recording medium a binary coded data the headmost bit of which is a binary coded signal "1" in synchronization with a bit synchronization clock pulse from said synchronization pulse generator means;

means coupled to said magnetic recording medium and to said $n$-scale counter for detecting the binary coded signal "1" being read out ahead of said binary coded data from the magnetic recording medium, to thereby produce a detection signal which sets the n-scale counter at the reference count so as to adjust the phase of the bit synchronization clock pulse; and means for reading out subsequent binary coded signals by bit synchronizing pulses generated for each predetermined count value of the n-scale counter which is set by the detection signal to a reference count value.

4. A data read-write apparatus according to claim 3 further comprising means for writing a synchronization bit represented by a binary coded signal "1" into each binary coded data item formed of a plurality of binary coded signals; and said detecting means detects a synchronization bit read out before each binary coded data from said magnetic recording medium to produce a detection signal which sets the n-scale counter at the reference count so as to adjust the phase of the bit synchronization clock pulse.

* * * * *